Aug. 28, 1956 — F. M. BROWNING ET AL — 2,760,594
ACTIVATED CARBON ADSORBERS
Filed April 3, 1953 — 2 Sheets-Sheet 1
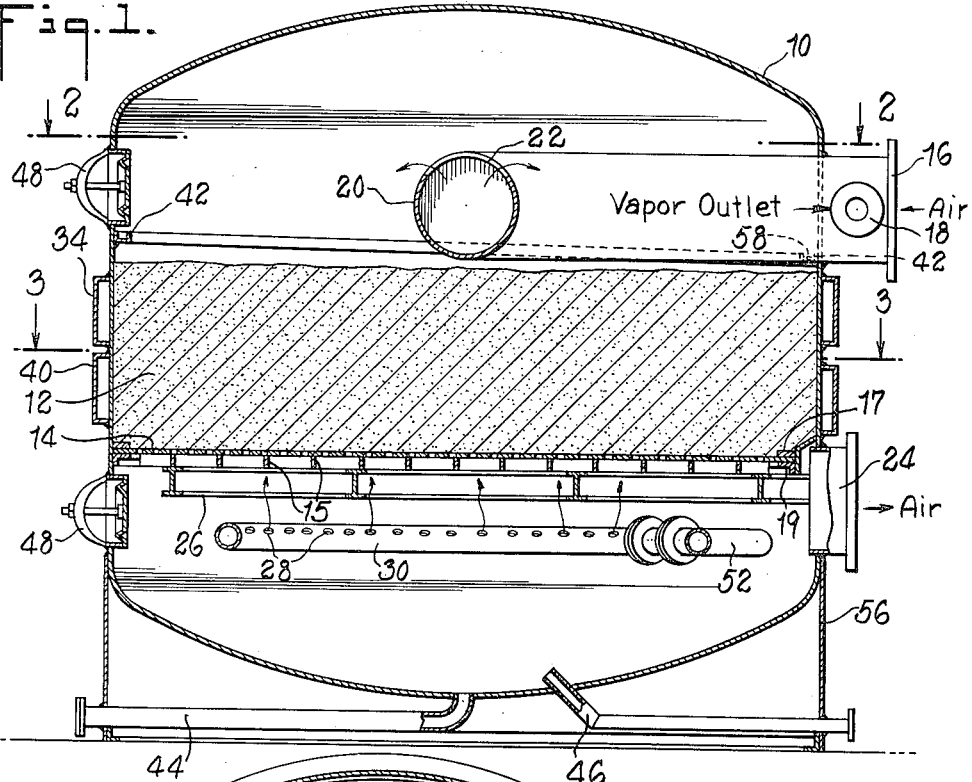
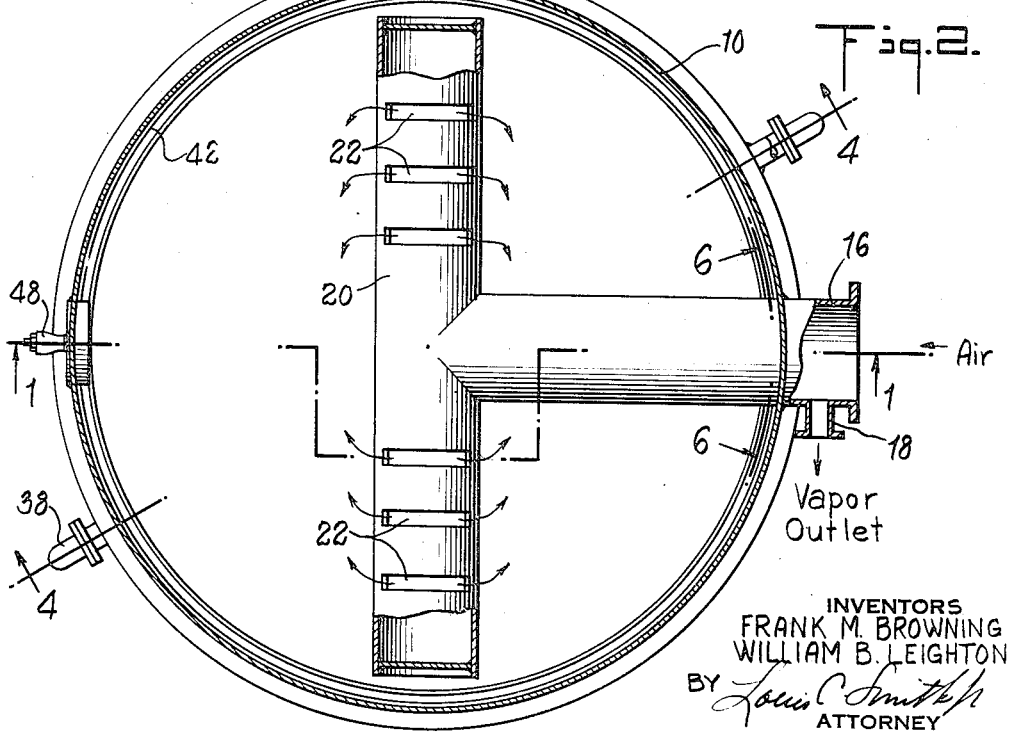
INVENTORS
FRANK M. BROWNING
WILLIAM B. LEIGHTON
BY Louis C. Smith
ATTORNEY Aug. 28, 1956 F. M. BROWNING ET AL 2,760,594
ACTIVATED CARBON ADSORBERS
Filed April 3, 1953 2 Sheets-Sheet 2
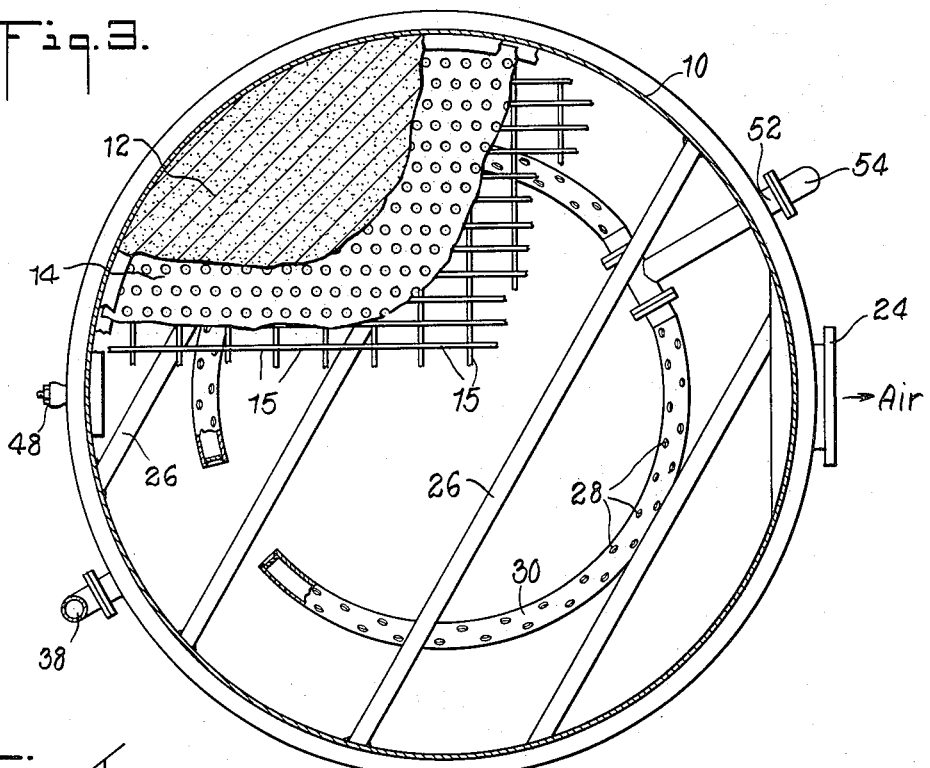
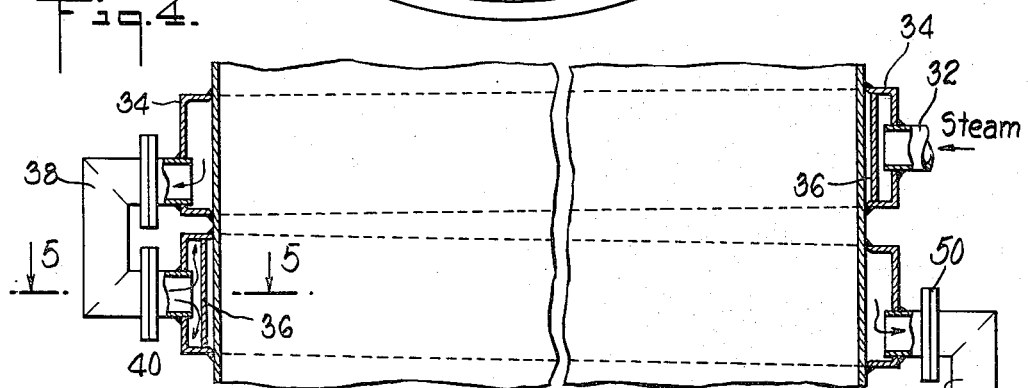
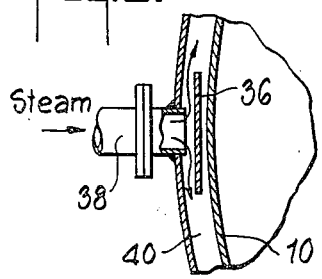
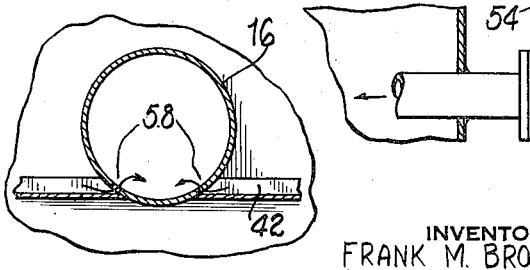
INVENTORS
FRANK M. BROWNING
WILLIAM B. LEIGHTON
BY Louis C. Smith Jr.
ATTORNEY 2,760,594
Patented Aug. 28, 1956

2,760,594
ACTIVATED CARBON ADSORBERS

Frank M. Browning, New York, N. Y., and William B. Leighton, Maplewood, N. J., assignors to Union Carbide and Carbon Corporation, a corporation of New York Application April 3, 1953, Serial No. 346,768

2 Claims. (Cl. 183—4.5)

This invention relates to a new and improved method and apparatus for use in the art of recovering solvents or other vapors from mixtures thereof with gases, by means of a solid adsorbent material, particularly activated carbon.

The art of removing vapors from gases by means of adsorbent materials is well known and several types of adsorber vessels have been developed for this purpose, most of them employing activated carbon as the adsorbent agent. These vessels are generally cylindrical in shape and may be of either vertical or horizontal construction. Basically, they all employ the principle of passing the vapor-laden gases through a bed of carbon suspended in the adsorber in such a manner that the gases must pass through the activated carbon before they are expelled from the vessel, leaving the vapors adsorbed on the carbon.

After a period of use, the activated carbon bed becomes saturated with the vapors removed from the gases, and the bed must be stripped of these vapors before further use. The stripping is usually done by passing steam directly through the carbon bed. While the use of steam is probably the most efficient method available, it has several distinct disadvantages.

In such an adsorber a portion of the steam is condensed due to the sensible heat of the vessel shell and condensation heat losses through the shell. Partial condensation of the steam in this manner results in accumulation of moisture in the outer edges of the bed, adjacent to the wall of the adsorber vessel, to a much greater extent than in the rest of the carbon bed.

This accumulation of moisture wets the outer edges of the carbon bed and thereby seriously impairs the efficiency of the activated carbon as an adsorbent, for it is known that the amount of solvent vapors which may be adsorbed by activated carbon with 100 per cent efficiency (known as the "breakpoint" of the carbon) is inversely proportional to the amount of moisture held by the carbon at the start of the adsorption process, and this effect becomes more pronounced as the period of use, porosity, and consequent water-adsorbing capacity of the carbon increases. It is also known that the breakpoint of an entire carbon bed is no greater than that at its weakest point, and a difference in moisture content between the edges and center of the carbon bed of as little as 5 per cent, has been shown to decrease, by 3.2 per cent, the breakpoint of the entire carbon bed. A further disadvantage is the excess corrosion of the adsorber shell which generally results from the wetting of the edges of the carbon bed.

The primary object of this invention is to prevent the wetting of the outer edges of the carbon bed in an activated carbon adsorber and thus overcome the difficulties described above, including the corrosion of the outer shell of the adsorber due to wetting of the carbon bed adjacent to it.

These objectives are achieved through the application of an external heating jacket to the adsorbent vessel and so changing and modifying the adsorber as to efficiently embody the jacket in the operational cycle. This external heating jacket is made to function so as to heat the area of the adsorber vessels shell which is adjacent to the perimeter of the activated carbon bed to a temperature approaching the temperature of the steam passing through the carbon bed, thereby preventing condensation of the steam and wetting of the bed, because no heat to heat the shell is taken from the steam passing through the carbon bed.

A distinct advantage of this invention lies in the fact that the entire cross-sectional area of the adsorber shell is utilized for the carbon bed. The heating jackets are of simple construction and are entirely external to the adsorber shell. This simplicity of construction and utilization of the entire carbon bed is a real advantage over several earlier types of adsorbers which attempted to solve the problem of the wetting of the carbon bed by building complicated retaining walls and other structures within the adsorber shell. Such devices were difficult to construct and effectively decreased the area of the carbon bed within the shell.

A further advantage lies in the fact that this invention can be adapted to many adsorbers already in use in order to greatly increase their efficiency.

Further advantages of the invention will become evident from a consideration of the drawings and the following description of them. These drawings illustrate the invention as embodied in a vertical type adsorber. It is just as suitable, however, for the horizontal type adsorber.

In the drawings:

Fig. 1 is a vertical section of a vertical adsorber embodying the invention;

Fig. 2 is a section on the line 2—2 of Fig. 1;

Fig. 3 is a section on the line 3—3 of Fig. 1;

Fig. 4 is a partial section on the line 4—4 of Fig. 2;

Fig. 5 is a partial section on the line 5—5 of Fig. 4; and

Fig. 6 is a partial section on the line 6—6 of Fig. 2.

Referring to the drawings, a heavy metal shell 10 serves as the main adsorber vessel, and is usually, though not necessarily, cylindrical in shape. It is shown in the drawings in a vertical position, though the whole invention is adaptable to be operated as a horizontal type unit, with a horizontal cylindrical shell as the base, and with the other parts in relative positions.

Within the shell 10 is a layer of activated carbon or other adsorbent material 12 which divides the main body shell into two halves. The carbon bed rests on a perforated metal plate 14, which, in turn, rests on a metal grating 15. The perforated metal plate is held in position by two circular rings 17 and 19 which are welded to adsorber shell 10. The metal grating, which is attached to the shell of the adsorber, can also be supported by an optional plurality of horizontal I-beams or structural girders 26 which are attached to the walls of the body 10. During the adsorption cycle of operation of the unit, the vapor-laden air or gas enters the adsorber through the air inlet pipe 16. At the center of the adsorber this inlet pipe abuts and is connected to a pipe of equal diameter 20 to form a T-shaped conduit. This second pipe 20 is closed at both ends and entrance for the vapor-laden gases into the actual body of the adsorber and thence to the carbon bed is provided through a plurality of parallel slots 22 in the top of the pipe 20. By admitting the vapor-laden air through these slots rather than directly into the top section of the adsorber, the air is diffused so as to permeate more evenly the total area of the carbon bed. After passing through the carbon bed 12, the air, now freed of its contained vapors, exits from the adsorber through the air exit pipe 24.

When the adsorbed vapors are to be removed from the bed of adsorbent material, the direction of flow is the reverse of that during the adsorption cycle. Steam from an outside source first enters the adsorber system through the steam inlet pipe 32 which admits it to the upper 34 of the two heating jackets 34 and 40 which constitute the heart of the invention. These two jackets of heavy gauge metal completely circumscribe the adsorber shell, covering the area which is adjacent to the activated carbon bed on the inner surface, and are welded to the shell. The steam upon entering the upper jacket 34 first impinges on a metal plate 36 which serves to protect the main body shell 10 from damage due to the striking force of the incoming steam. The steam is thus diverted through the upper jacket 34 and around the outer shell 10 of the adsorber on both sides. The steam exists from the upper jacket 34 on the other side of the adsorber 10 through a connecting pipe 38 which directs it into the lower heating jacket 40 where it again strikes a protective plate 36 before passing again around the adsorber at the lower level through the lower heating jacket 40. This latter jacket covers the lower half of the area of the adsorber shell which is adjacent to the carbon bed on its inner surface. After existing from the lower jacket 40 the steam enters a pipe 54 which directs it downward to the pipe 52 which feeds the steam sparger 30.

The drawing illustrates the use of two connected steam jackets. However, practical consideration, such as the size of the adsorber, might make the use of only one jacket, or of more than two, desirable. The use of more or less than two jackets is entirely harmonious with the concept of the invention and the necessary rearrangement of the connecting couplings for such a number will be obvious to one skilled in the art. Should it be desirable for any reason to operate the adsorber without using the heating jackets, the steam can be brought directly from the source of supply into the sparger connecting pipe 52, thus by-passing the heating jackets.

The steam sparger 30 is a curved piece of pipe forming a partial circle designed to give uniform distribution of the stream. The ends are closed and the steam enters at the middle of the curved segment. The steam is released through a plurality of small holes 28 in two rows which are on alternate sides of the pipe at a suitable angle. As the steam is released through these holes, it rises through the carbon bed, vaporizing and carrying with it the adsorbed vapors in the carbon bed. The vapor-laden steam exits from the adsorber through the same slots 22 used for the incoming gases in the adsorption cycle, and is drawn off from the pipe 16, through the vapor outlet pipe 18. A drain channel 42 catches any steam or vapors which may condense on the upper walls of the adsorber and empties through the holes 58 in Fig. 6 into the pipe 16 from which this condensation may be collected.

Easy access is had to the adsorber for purposes of cleaning the adsorber or renewing the activated carbon or adsorbent material through the manholes 48, and a cleanout pipe 44 is provided at the bottom of the adsorber shell. Also at the bottom of the adsorber shell is a drain leg 46 for carrying off any condensed steam. This drain leg 46 is raised above the inside surface of the adsorber shell 10 so as to prevent contaminating it with carbon fines and mill scale, which are removed periodically through the cleanout pipe 44. The adsorber shell is supported by a circular base 56 of heavy gauge metal, as shown in the drawing. However, any suitable means of support, such as metal legs, could be used.

A number of advantages of this apparatus are apparent from the above explanation of the drawings. The T-shaped vapor inlet is so designed as to provide even distribution of the incoming vapor over the whole area of the adsorbent bed, without disturbing the bed. Disturbance of the carbon bed due to turbulence of the vapors has long been a problem in carbon adsorbers. When the flow is uneven, thin areas develop in the bed and the effect is cumulative, resulting in loss of efficiency. Perforated plates on top of the bed have been used to try to prevent this effect, but have not been sucessful. The use of the T-shaped inlet permits rates of gas flow of 95 to 100 feet per minute, whereas formerly a rate of 60 to 70 feet per minute was considered the optimum.

An important advantage results from the connected system whereby the same steam, under the same pressure, both heats the shell and removes the vapors from the bed. This assures sufficient heating of the shell and avoids any heat differential between the outer adsorber with its attendent condensation and wetting of the carbon bed. Any superheat in the steam available, which would be wasted if the steam were passed directly into the adsorber, is utilized in heating the shell.

We claim:

1. An adsorber for recovering vapors from mixtures thereof with gases such as air, said adsorber comprising an adsorber vessel, a bed of adsorbent material within said vessel separating said vessel into two parts, an inlet duct for uniform distribution of vapor-laden gas within said vessel on one side of the separating bed of adsorbent material, said inlet duct being T-shaped and being so positioned that the head of the T of said duct is substantially parallel to the top surface of said adsorbent bed, and said inlet duct having a plurality of distribution slots positioned in the surfaces of the arms of the T of said duct farthest from said bed of adsorbent material exit means for denuded gas on the opposite side of said adsorbent material, at least one steam jacket encircling the outside of said adsorber vessel and substantially covering the area of said adsorber vessel which is in contact with the bed of adsorbent material on the inside surface of said adsorber vessel, means for introducing steam into said jacket and for conveying said steam, after it has circulated through the steam jacket, into the adsorber vessel on one side of the separating bed of adsorbent material, means for removing the vapor and steam mixture from the opposite side of the bed of adsorbent material from that on which the steam is admitted, and means around the inside perimeter of the adsorber vessel above the bed of adsorbent material to collect condensate and conduct said condensate outside said adsorber vessel.

2. An adsorber for recovering vapors from mixtures thereof with air, said adsorber comprising a cylindrical adsorber vessel, a bed of activated carbon within said vessel and dividing said vessel into two parts, a T-shaped inlet duct for vapor-laden air within said vessel and above said bed of activated carbon, said inlet duct being so positioned that the head of the T of said duct is substantially parallel to the top surface of said adsorbent bed, and said inlet duct having a plurality of distribution slots positioned in the surfaces of the arms of the T of said duct farthest from said bed of activated carbon exit means for denuded air below said activated carbon bed, at least one steam jacket encircling the outside of said adsorber vessel and substantially covering the area of said adsorber vessel which is in contact with the activated carbon bed on the inside surface of said adsorber vessel, means for introducing steam into said jacket and for conveying said steam, after it has circulated through the steam jacket, into the adsorber vessel below the bed of activated carbon, means for removing the vapor and steam mixture from the part of one adsorber vessel above the separating bed of activated carbon, and means around the inside perimeter of the adsorber vessel above the bed of activated carbon to collect condensate and conduct said condensate outside the adsorber vessel.

References Cited in the file of this patent

UNITED STATES PATENTS

| | | |
|---|---|---|
| 642,469 | Martin | Jan. 30, 1900 |
| 707,354 | Pratt | Aug. 19, 1902 |

(Other references on following page)

UNITED STATES PATENTS

| | | |
|---|---|---|
| 1,276,690 | Pyzel | Aug. 20, 1918 |
| 1,281,597 | Lessing | Oct. 15, 1918 |
| 1,509,280 | Baker | Sept. 23, 1924 |
| 1,661,104 | Barneby | Feb. 28, 1928 |
| 1,862,507 | Gray | June 7, 1932 |
| 1,863,656 | Hartman | June 21, 1932 |
| 1,875,199 | Parkman | Aug. 30, 1932 |
| 1,920,870 | Lancaster | Aug. 1, 1933 |
| 2,114,810 | Ray | Apr. 19, 1938 |

FOREIGN PATENTS

| | | |
|---|---|---|
| 397,128 | Great Britain | Aug. 8, 1933 |